United States Patent
Guim Bernat et al.

(10) Patent No.: US 12,401,696 B2
(45) Date of Patent: Aug. 26, 2025

(54) NETWORK SUPPORTED LOW LATENCY SECURITY-BASED ORCHESTRATION

(71) Applicant: Intel Corporation, Santa Clara, CA (US)

(72) Inventors: Francesc Guim Bernat, Barcelona (ES); Hassnaa Moustafa, Portland, OR (US); Kshitij Arun Doshi, Tempe, AZ (US); Christian Maciocco, Portland, OR (US); Vesh Raj Sharma Banjade, Portland, OR (US); Satish Chandra Jha, Portland, OR (US); S M Iftekharul Alam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 17/484,617

(22) Filed: Sep. 24, 2021

(65) Prior Publication Data
US 2022/0014566 A1    Jan. 13, 2022

(51) Int. Cl.
*H04L 9/40*    (2022.01)
(52) U.S. Cl.
CPC .................................. *H04L 63/205* (2013.01)
(58) Field of Classification Search
CPC ..................................................... H04L 63/205
See application file for complete search history.

(56) References Cited

U.S. PATENT DOCUMENTS

| | | | |
|---|---|---|---|
| 9,674,182 B2 | 6/2017 | Smith | |
| 10,129,299 B1 * | 11/2018 | McClintock | ........ H04L 63/0869 |
| 2011/0209196 A1 * | 8/2011 | Kennedy | ................ G06Q 30/02 |
| | | | 726/1 |
| 2015/0319192 A1 * | 11/2015 | Cabrera | .................. H04L 63/10 |
| | | | 726/1 |
| 2016/0156663 A1 * | 6/2016 | Nagaratnam | ........... G06F 21/57 |
| | | | 726/1 |
| 2020/0210585 A1 * | 7/2020 | Thom | ...................... G06F 21/71 |
| 2022/0014566 A1 * | 1/2022 | Guim Bernat | .......... G06F 21/57 |
| 2022/0038468 A1 * | 2/2022 | Jeevagunta | ......... H04L 63/1425 |
| 2022/0239700 A1 * | 7/2022 | Ping | ........................ H04L 41/40 |

FOREIGN PATENT DOCUMENTS

WO    WO-2018063666 A1    4/2018

OTHER PUBLICATIONS

EPO search opinion for application No. 22 190 994.8, 2 pages, mailing date: Feb. 14, 2023. (Year: 2023).*
EPO search report for application No. EP 22 19 0994, 2 pages, Feb. 3, 2023. (Year: 2023).*

* cited by examiner

*Primary Examiner* — Ponnoreay Pich
(74) *Attorney, Agent, or Firm* — Schwegman Lundberg & Woessner, P.A.

(57) ABSTRACT

Various aspects of methods, systems, and use cases include security-based orchestration. A method may include evaluating, within a secure environment of an untrusted device, a preamble to determine a set of security requirements. The method may include, providing, to an attestation server, an indication of security parameters for services of the untrusted device corresponding to security requirements of the set of security requirements, and in response to receiving a confirmation from the attestation server, providing a request to the untrusted device outside the secure environment to generate a trusted domain including the services.

25 Claims, 15 Drawing Sheets

NETWORK SUPPORTED LOW LATENCY SECURITY-BASED ORCHESTRATION

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

A new era of compute is emerging in which intensive compute operations are no longer performed primarily in data centers at the core of a network. Rather, with new data transport technologies, such as 5G and new types of fabrics (e.g., network architectures), compute resources may be placed in locations that are remote from a conventional data center. For example, compute resources may be available both in cell towers, base stations, and central offices. Furthermore, given their remote placement (e.g., remote from the core of a network), many of the compute devices that will perform the compute operations or interact with the edge devices may have unknown security clearance. As such, the security of compute locations may fluctuate over time leading to an inability to guarantee a fixed level of security.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The system and methods described herein may be used to provide network supported low latency security-based orchestration. One big challenge in network orchestration today is that systems are highly distributed and heterogenous. This implies that when a device or end user needs to execute a particular function to a particular data set it becomes very complicated to provide requirements (e.g., data security, isolation, compute needs, etc.) because the requirements and execution depend on features and characteristics of an execution device. On the other hand, services may be able to take some trade-offs on what or how to execute a function depending on such features. The systems and methods described herein solve this technical problem by providing a last mile orchestration decision using a preamble to represent end user or compute requirements, specifications, or needs.

Figure 1:
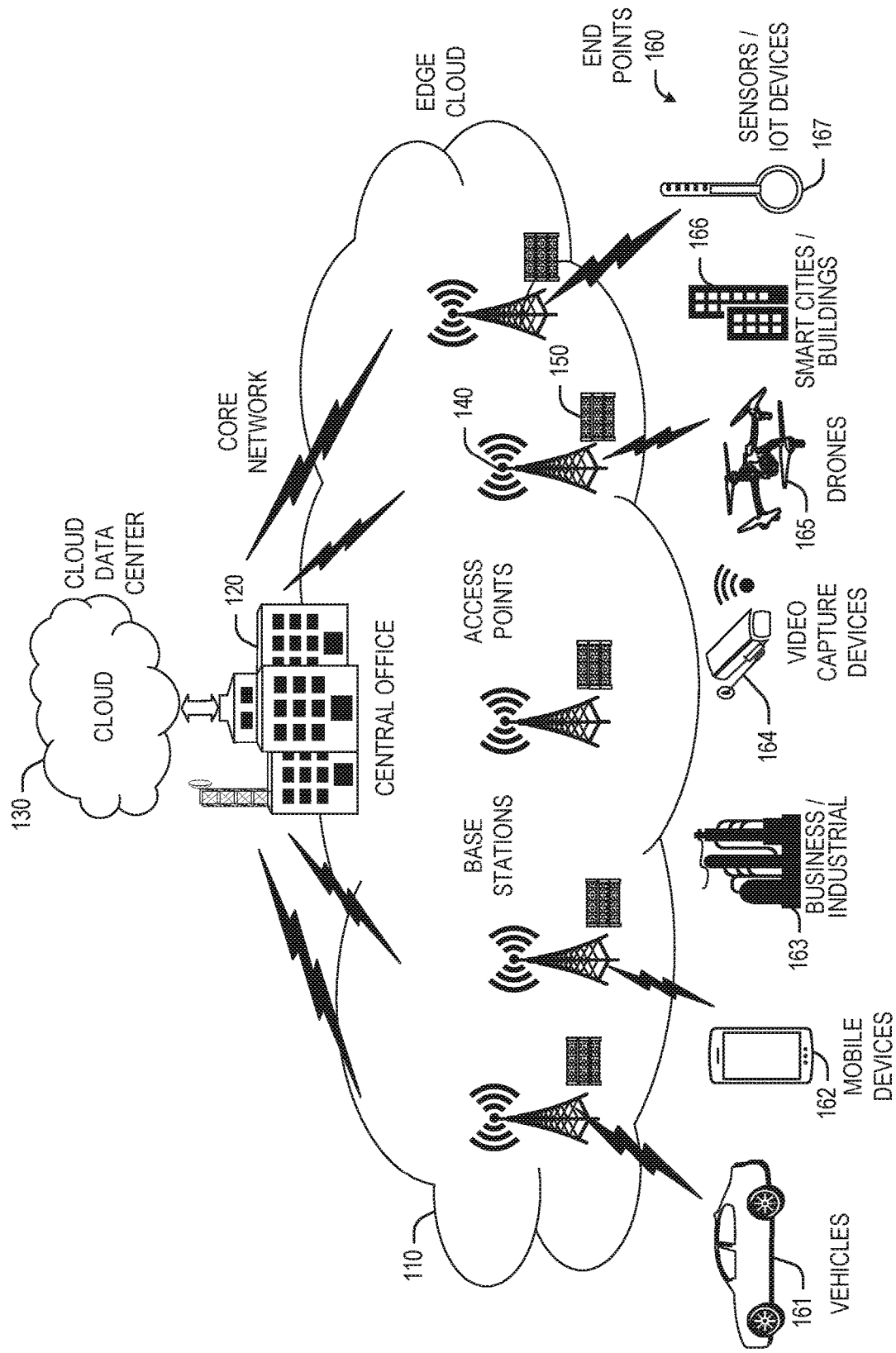
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
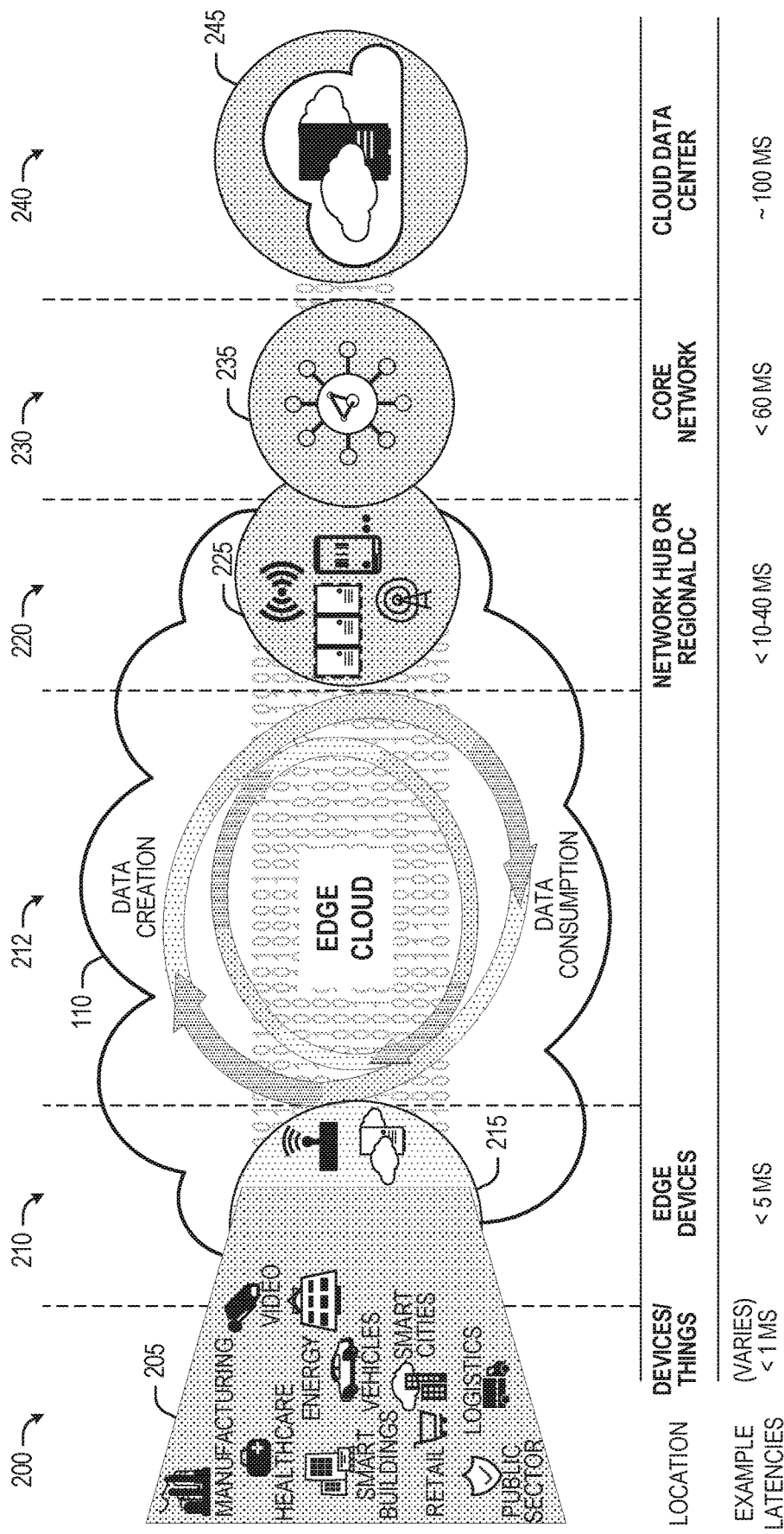
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge". "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be an appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
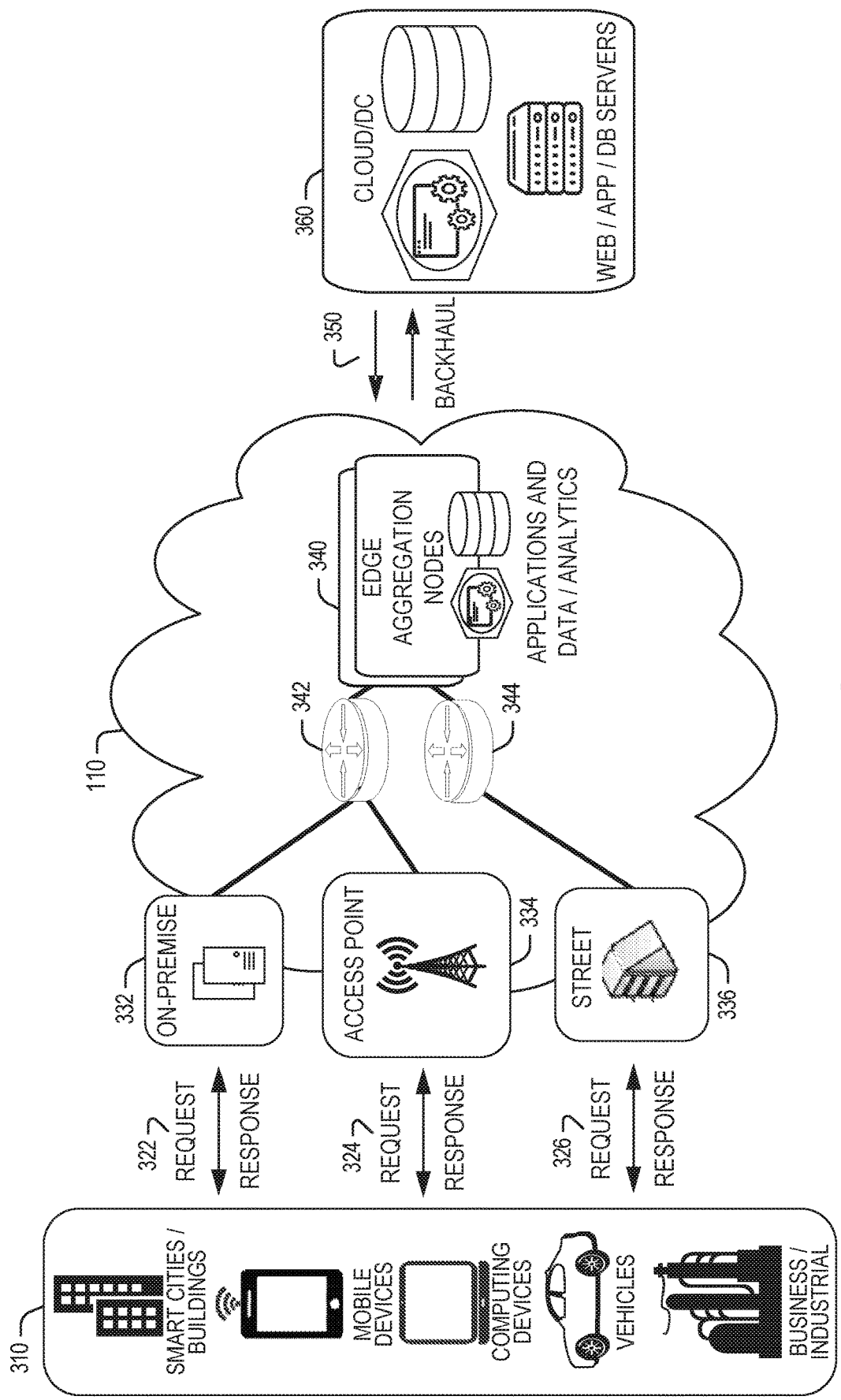
FIG. 3 illustrates an example approach for networking and services in an edge computing system.

In FIG. 3, various client endpoints 310 (in the form of mobile devices, computers, autonomous vehicles, business computing equipment, industrial processing equipment)

exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
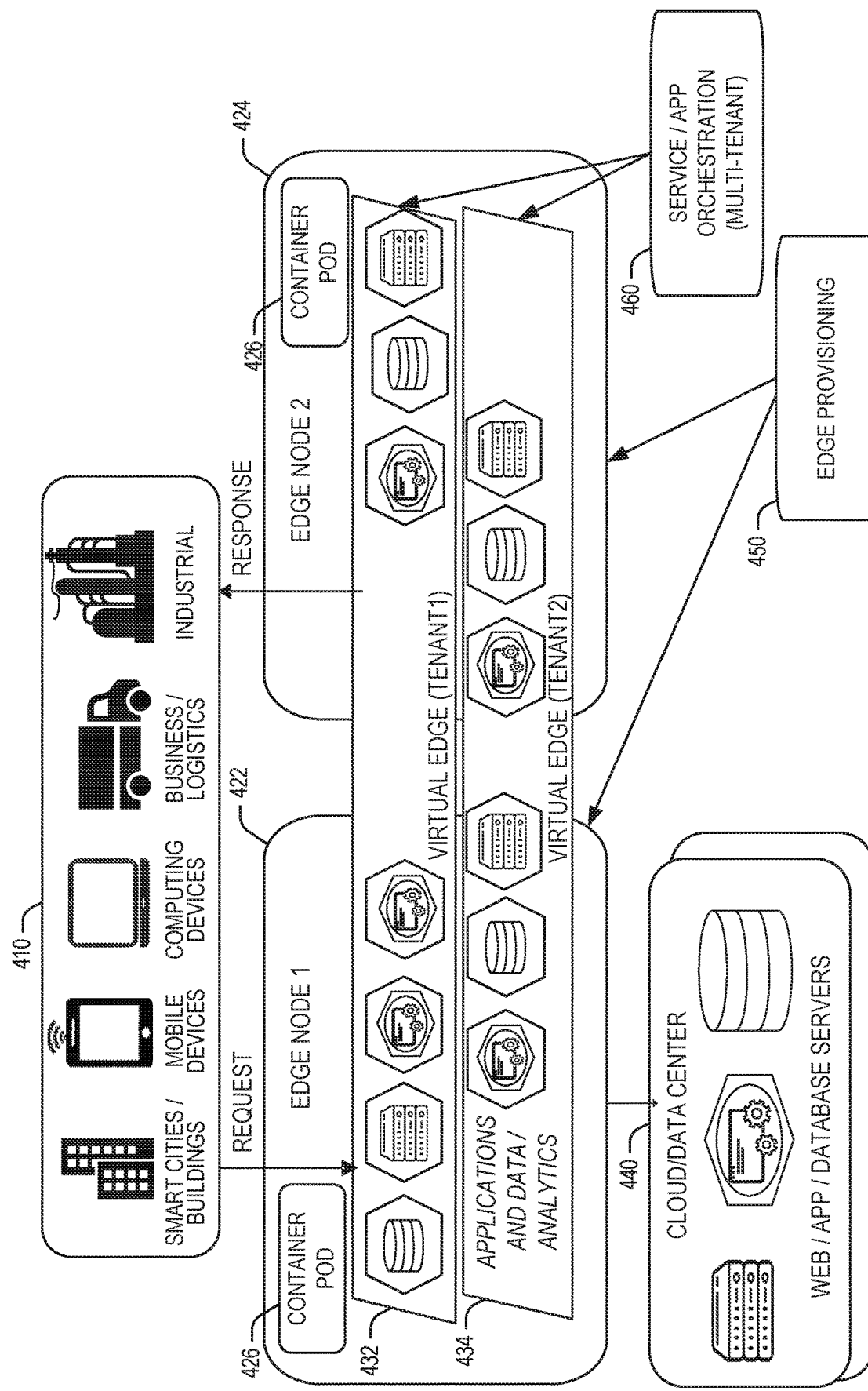
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist: and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers. FaaS engines. Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
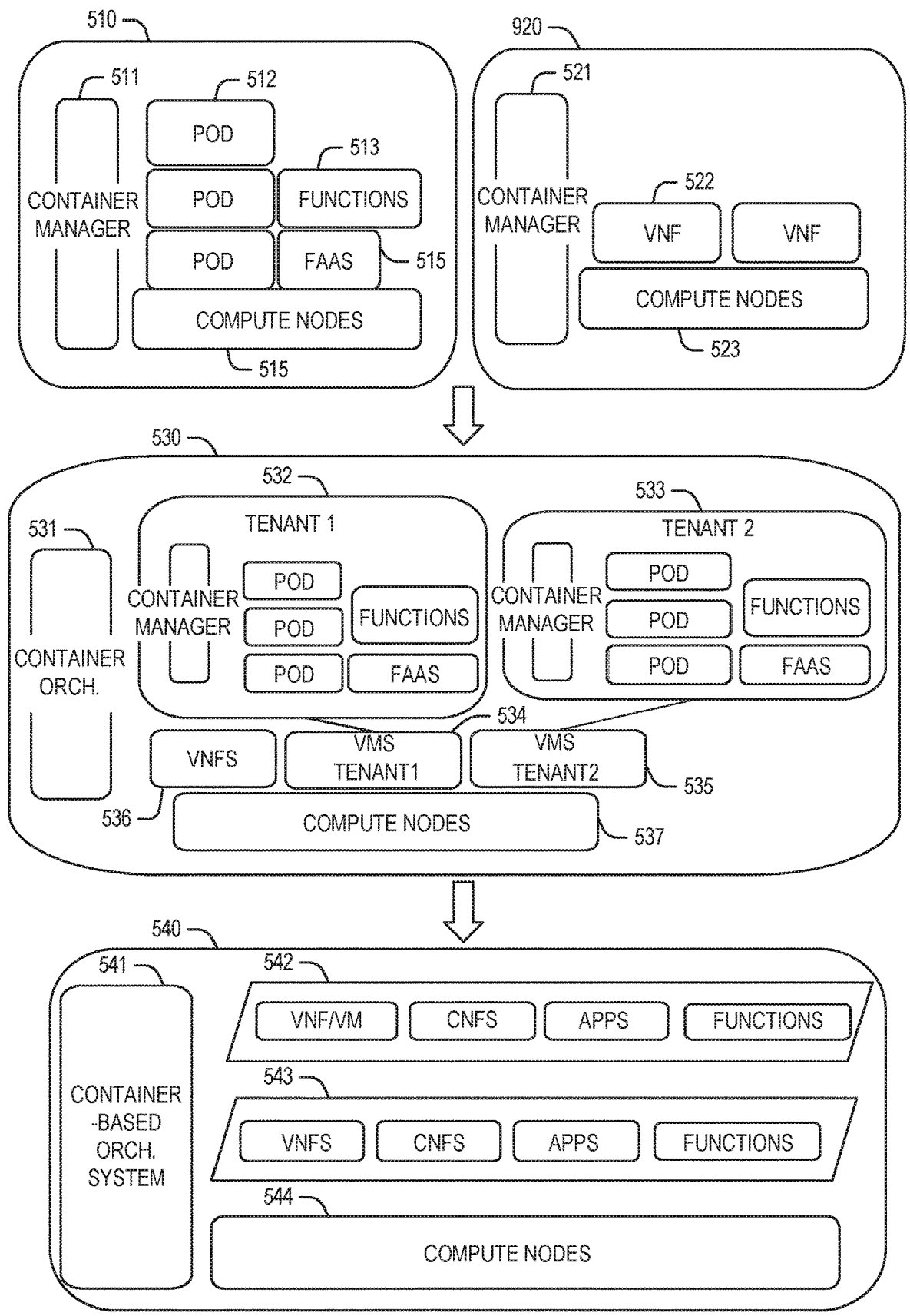
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513. VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
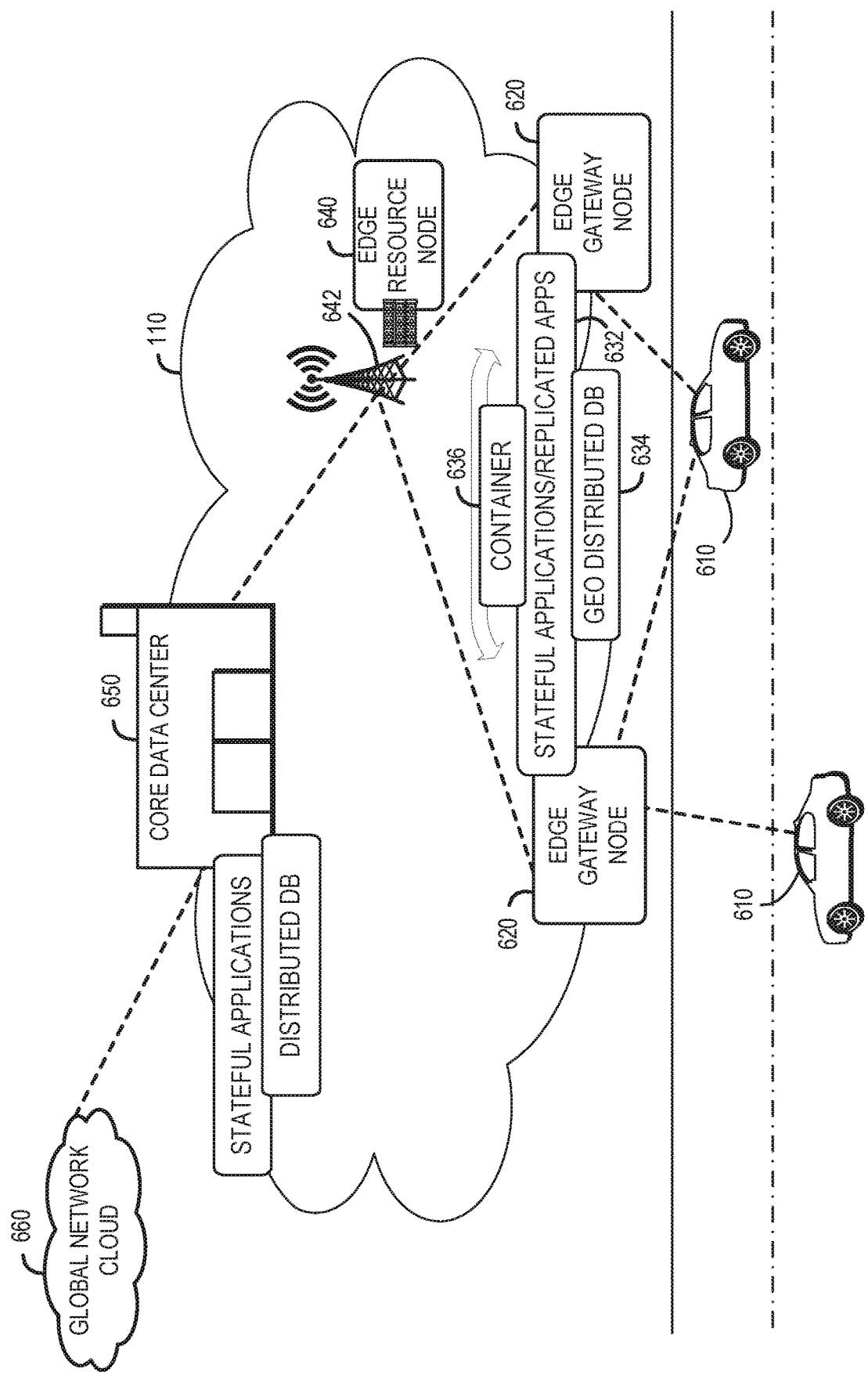
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example. FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
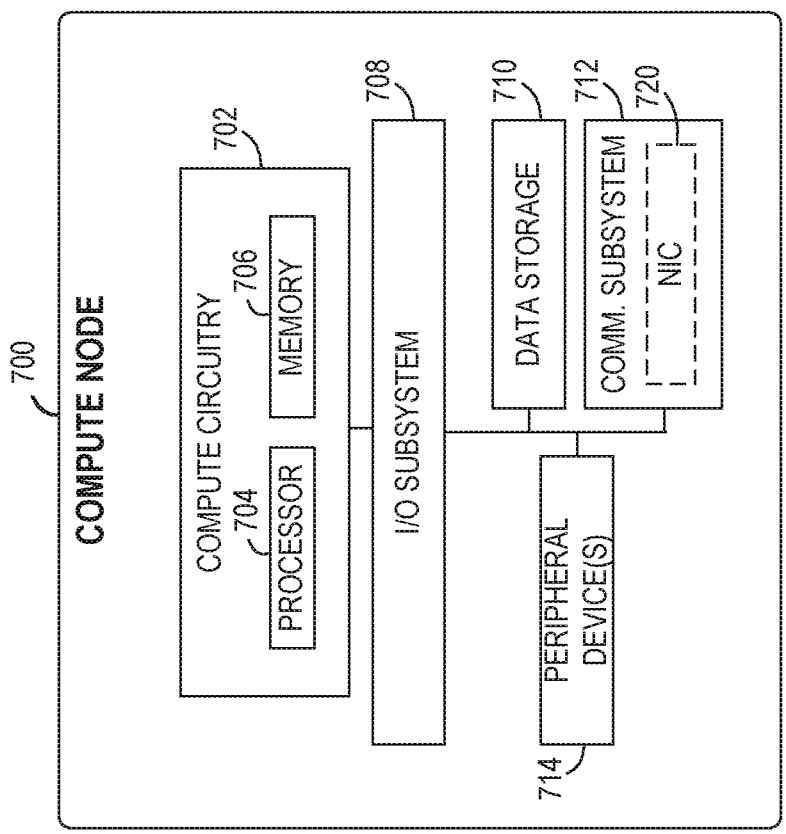
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
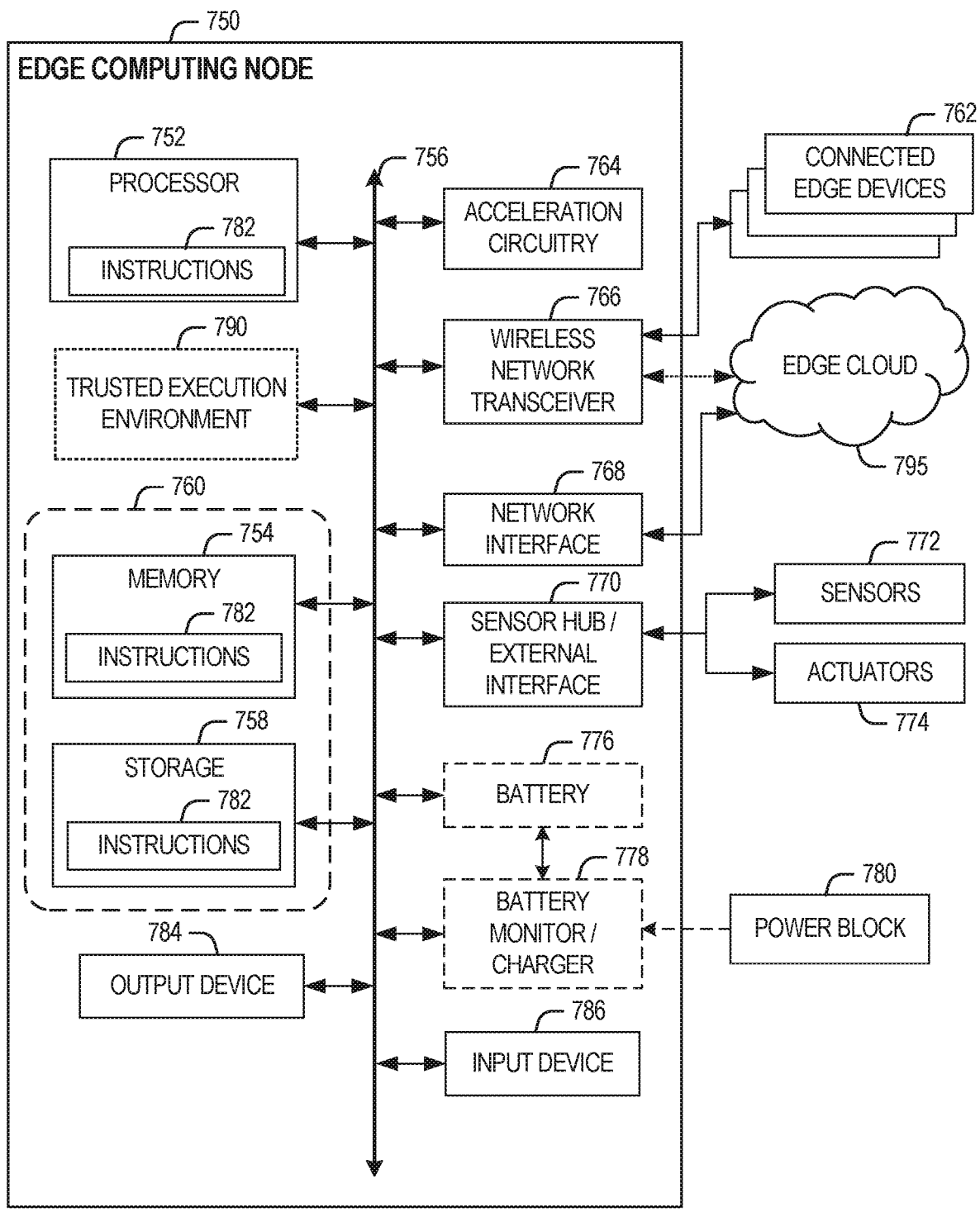
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices. Inc. (AMD®) of Sunnyvale, California a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments. Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR. LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM. JESD79-4A for DDR4 SDRAM. JESD209 for Low Power DDR (LPDDR). JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules. e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx). PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, Texas The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 8:
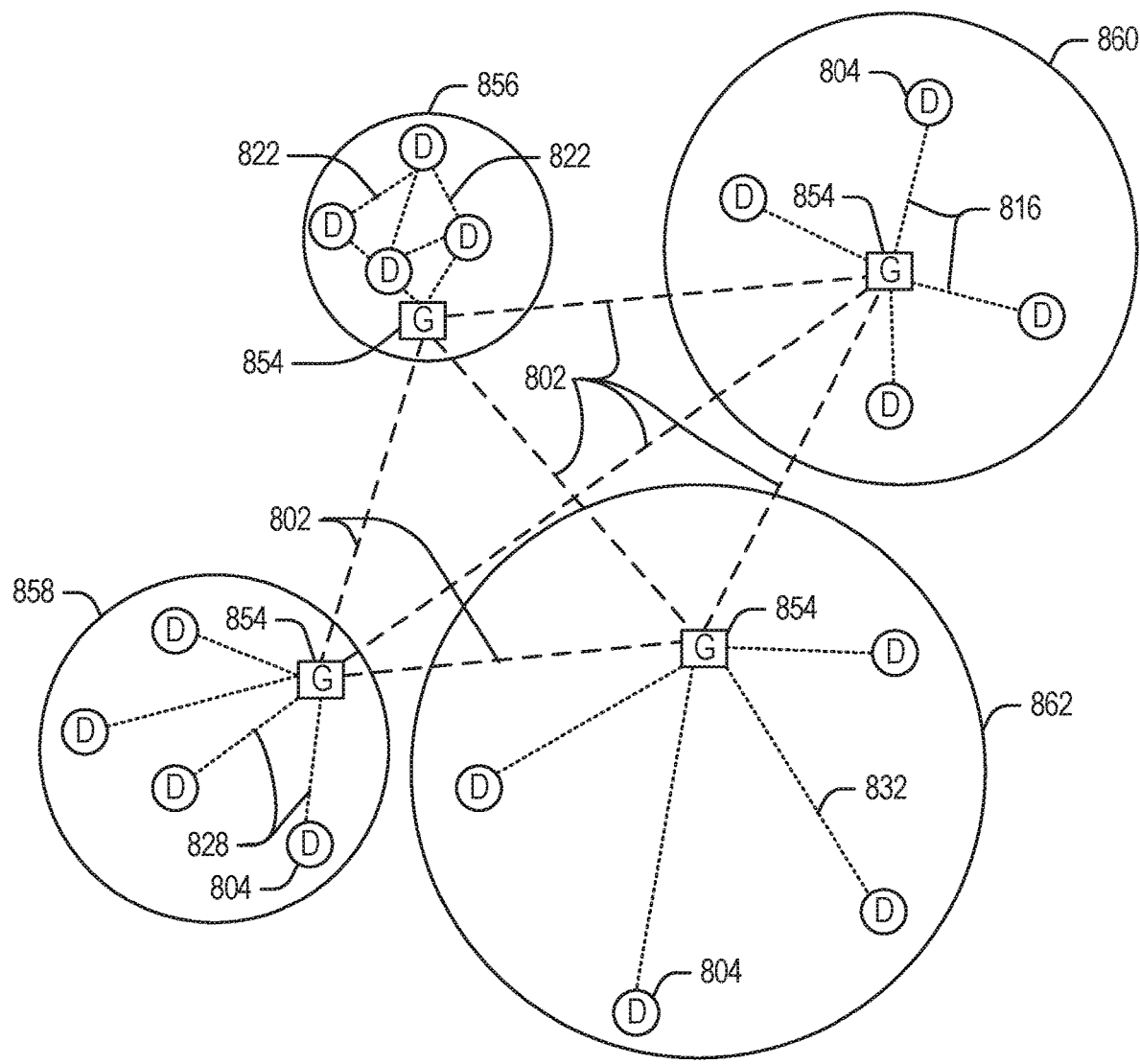
FIG. 8 illustrates a domain topology for respective internet-of-things (IoT) networks coupled through links to respective gateways, according to an example.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 9:
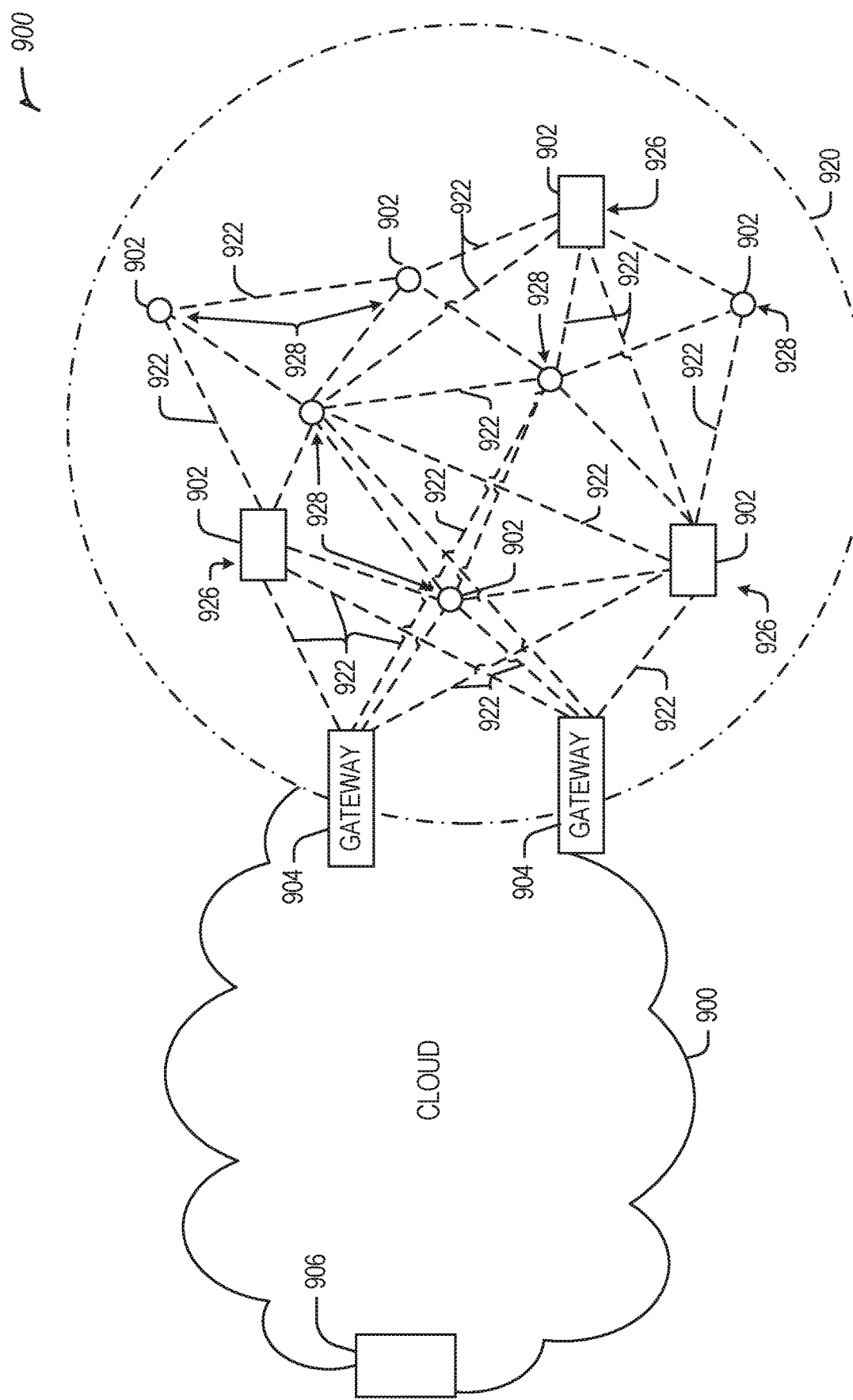
FIG. 9 illustrates a cloud computing network in communication with a mesh network of IoT devices operating as a fog device at the Edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8 and 9, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or integrated into "Edge" computing systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies. This is discussed further with respect to the communication environment and hardware of an IoT processing device depicted in FIG. 10.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 9 below.

FIG. 9 illustrates a cloud computing network in communication with a mesh network of IoT devices (devices 902) operating as a fog platform in a networked scenario. The mesh network of IoT devices may be termed a fog network 920, established from a network of devices operating at the Edge of the cloud 900. To simplify the diagram, not every IoT device 902 is labeled.

The fog network 920 may be considered to be a massively interconnected network wherein a number of IoT devices 902 are in communications with each other, for example, by radio links 922. The fog network 920 may establish a horizontal, physical, or virtual resource platform that can be considered to reside between IoT Edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the Edge and the cloud. Thus, references in the present document to the "Edge", "fog", and "cloud" are not necessarily discrete or exclusive of one another.

As an example, the fog network 920 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be Edge devices that provide communications between the cloud 900 and the fog network 920, and may also provide the backend process function for data obtained from sensors 928, such as motion data, flow data, temperature data, and the like. The data aggregators 926 may collect data from any number of the sensors 928, and perform the back-end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog network 920 provided from these IoT devices 902 may be presented to devices in the cloud 900, such as a server 906, as a single device located at the Edge of the cloud 900, e.g., a fog network operating as a device or platform. In this example, the alerts coming from the fog platform may be sent without being identified as coming from a specific IoT device 902 within the fog network 920. In this fashion, the fog network 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog platform may be configured in a declarative programming style, enabling the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog network 920 device the IoT devices 902, such as particular sensors 928, needed to answer the query. The data from these sensors 928 may then be aggregated and analyzed by any combination of the sensors 928, data aggregators 926, or gateways 904, before being sent on by the fog network 920 to the server 906 to answer the query. In this example, IoT devices 902 in the fog network 920 may select the sensors 928 used based on the query, such as adding data from flow sensors or temperature sensors. Further, if some of the IoT devices 902 are not operational, other IoT devices 902 in the fog network 920 may provide analogous data, if available.

In other examples, the operations and functionality described herein may be embodied by an IoT or Edge compute device in the example form of an electronic processing system, within which a set or sequence of instructions may be executed to cause the electronic processing system to perform any one of the methodologies discussed herein, according to an example embodiment. The device may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 10:
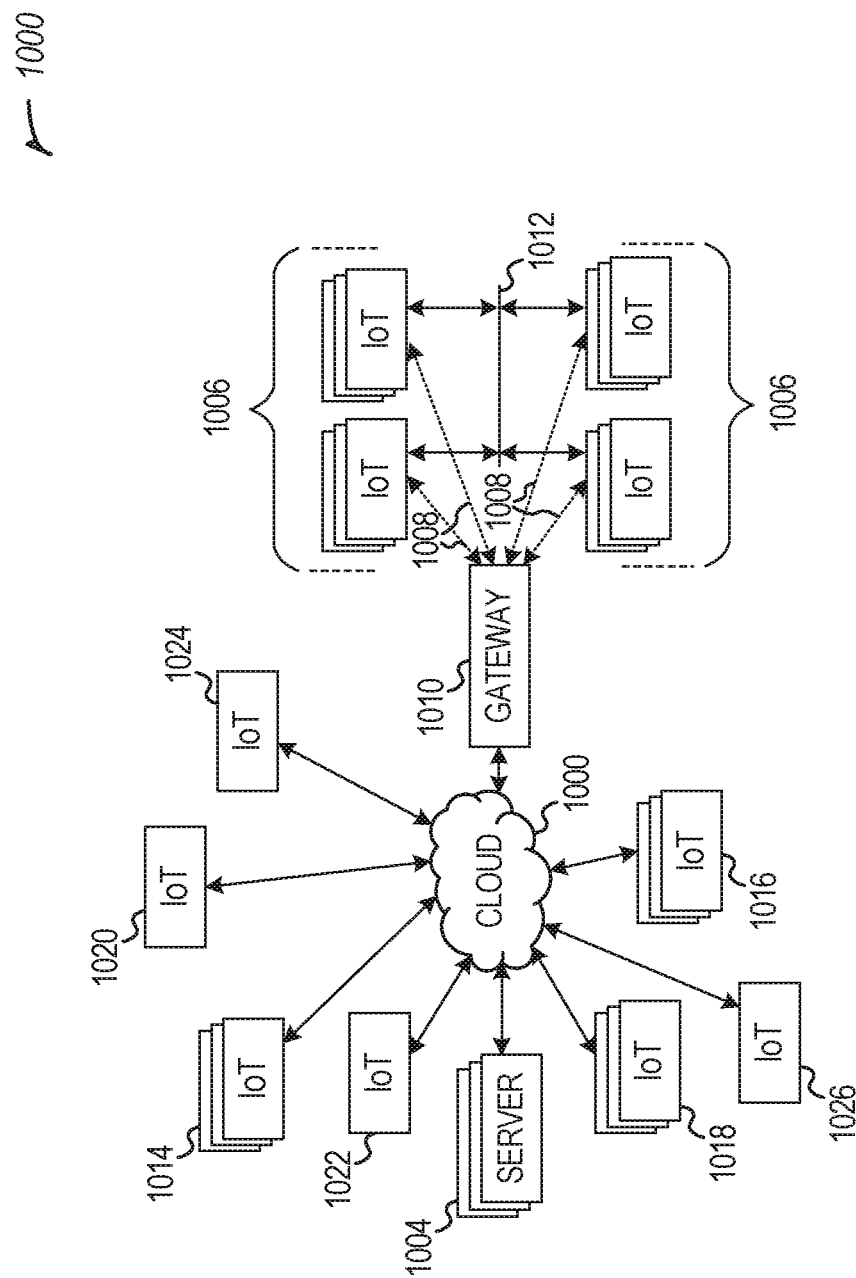
FIG. 10 illustrates a drawing of a cloud computing network, or cloud, in communication with a number of Internet of Things (IoT) devices, according to an example.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local Edge cloud or fog implementation among a local area network. Further, the gateway 1028 that is depicted may operate in a cloud-to-gateway-to-many Edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As may be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

As discussed above, the systems and methods described herein provide for network supported low latency security-based orchestration. The systems and methods described herein include a new technique to assure security requirements to a function request as specified or encoded by the client without causing a visible overhead. In this technique, the infrastructure (e.g., an edge device, an orchestrator, a switch, etc.) may be aware of functions that a vendor solution provider makes available in the platforms/edges. The security methods offered by the vendors may be identified (e.g., stored in a table, queried, etc.), including security methods that a vendor may be providing on-demand upon function request. The client may specify one or more of the vendors (or other constraints) and the required security methods, along with each function request. In some examples, performance requirements from a client side may be included with a list of vendors and required security methods. In this example, performance of a function implemented by different vendors may vary and a tradeoff between security and performance exists.

The client may supplement a function request with a preamble code (e.g., code in a prologue, in a header in a request, in a trailer of a request, in a packet, etc., with or without changes or updates to the processing of current protocol headers). The preamble code may be executed at a gateway on a compute device such as an FPGA or other type of accelerator. The preamble may be executed before other code of a packet, binary, data structure, or the like. The preamble code may use an API exposed by the gateway to access a list of vendors and security methods associated with each available function or service that is relevant for the request.

As the result of the preamble code's execution, a list of matching function services to which the client's request may be mapped to are generated. By allowing a client to specify these security requirements and services and executing the preamble, the client has more control directly, without adding overhead either to the client or to any unnecessary orchestrator. The gateway may map the function request to one of the matching services. By providing the preamble code, the client may ensure that required checks on the vendors and security requirements are performed, such as function version, security methods available, date of update etc. The requests may be applied on a request granularity flexibly. Clients may choose to specify a simple list of trusted vendors and required security methods for a function request as parameters when submitting the request instead of a preamble code. The gateway may run a default prologue code with these parameters and arrive at a matching list of FaaS services that may be mapped for the request. Security FaaS may be considered in microservices forms on-boarded on-demand (e.g., specific encryption algorithms, key certificates) in some examples.

In an example, applications on client devices that are running in cars, edge devices, phones, appliances, base station, etc., may use other devices to execute higher power, more compute, or specialized hardware compute elements. An edge appliance that offers compute to other devices may be unknown or untrusted by the client device. The edge appliance may have varying levels of security or security capabilities for different hardware components, tasks, or clients. If security is not met for an application request, then the requestor may not want to use the edge appliance.

A preamble sent by an application of a client device to an untrusted device may be executed via trusted domain execution (TDX). The TDX may operate within the CPU of the client device in a trusted domain, where the preamble may be executed without any exposure to the code (e.g., no hypervisor or OS can access the code).

When an application needs to execute code on a particular edge device, the application may provide a preamble that can run in the TDX. The preamble checks the hardware or edge appliance for security and compute elements (in some examples, both security and possibility for executing may be checked, such as hardware, software needs). After verifying that the edge device may be trusted, the application may send a binary for execution (or the preamble may be part of the binary, so it 'sends' from the TDX to outside the TDX for execution).

In an example, a component of a vehicle sends a request out to two base stations, receives attestation from each base station (or a first attested base station), receives platform attestation (e.g., TPM, based on firmware, hardware config, etc.), such as from an attestation server (e.g., an external attestation entity that verifies the platform is valid). A signature from a third party server for example may be used for whether the base station has the preamble or BMC secure operation space. When a base station does not support preamble execution, another base station may be sent the request.

When a base station has the preamble capabilities, a small binary including a preamble may be sent to the platform (e.g., the base station). The small compute element may receive all the resources available to the platform (or all requested resources). The resources (e.g., memory, storage, accelerators, GPUs, etc.) may be received as a list, provided to the preamble executing in a trusted domain. The preamble may select the needed resources and request that each be attested. The preamble or the base station may reach out to an attestation server for validation of each resource.

When all resources are attested, the preamble may request that the platform or base station compose those resources into a trusted domain, and instantiate services within the trusted domain and execute. After execution, results may be sent back to the component of the vehicle. When resources are not available, another platform may receive the request. When there are no resources available (e.g., not trusted, lacking security, or capabilities do not exist), then no execution of service within this platform may occur, and the component of the vehicle may attempt in another platform. In another example, the component of the vehicle may send modified requirements (e.g., a request having lower security requirements, which may be less accurate but include fewer personal details, and may be sufficient, but not a best-case scenario for execution).

The component may have different security requirements for different portions of an algorithm or compute task, or different implementations of an algorithm, such as some with more relaxed security. In some examples, security or execution requirements may vary based on hardware requirements or capabilities (e.g., platform lacks GPU, or has GPU but possibly lacking enough security, switch to a different implementation of algorithm such as using hardware accelerator of the platform). Tradeoffs for security versus time may be managed by the requestor component, and may be specified in the preamble (e.g., without need to return to the component). The specifications may be included in an service-level agreement (SLA) in an example.

Figure 11:
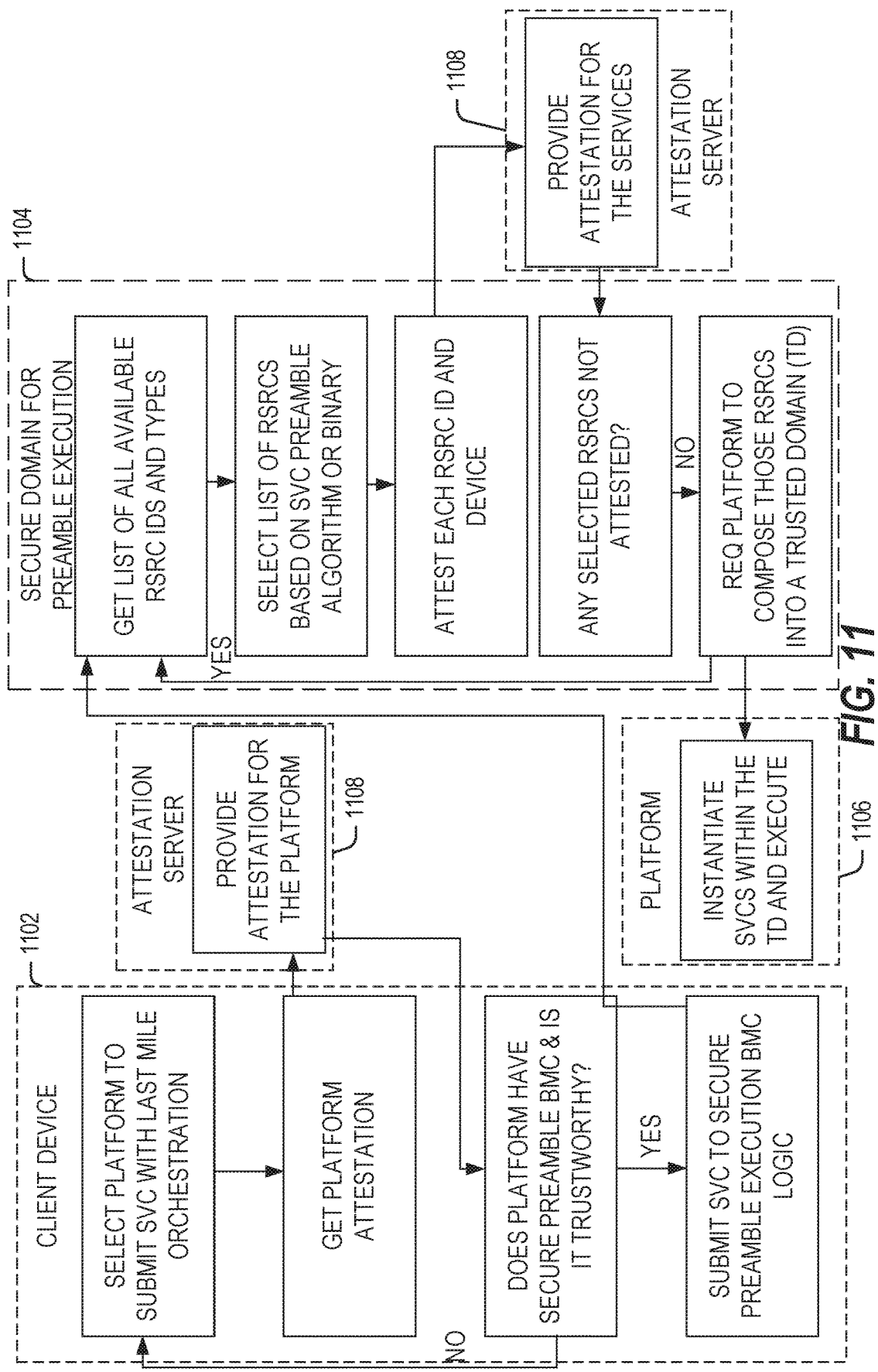
FIG. 11 illustrates a flow diagram showing security-based orchestration using a preamble according to an example.

FIG. 11 illustrates a flow diagram showing security-based orchestration using a preamble according to an example. The flow diagram illustrates flow from a client device 1102 to a preamble execution 1104 on a platform device 1106, and includes an attestation server 1108. FIG. 11 provides a description of a flow that may be performed when executing a preamble in a secure domain 1104 of the platform device 1106. The flow starts with the client device 1102 requesting to execute a service or function. The client device 1102 selects the platform 1106 that provides preamble-based last mile orchestration. Once selected, the client device 1102 may forward the preamble and a service into the platform 1106. The platform 1106 may create or designate the secure domain 1104 for executing the preamble. The preamble is executed in the secure domain 1104 (e.g. a secure enclave or any trusted execution environment, such as in the Infrastructure Processing Unit (IPU) or Board Management Controller (BMC), FPGA, etc.). The preamble may iterate over the different resources that the platform has and select the ones that are required based on the secure service requirements. After selecting resources, the preamble may perform resource attestation (e.g., using an external server, such as the attestation server 1108). When all the selected resources are validated and attested, the preamble may request that the CPU of the platform 1106 create a trusted domain with the requested resources to spawn the services for execution.

Figure 12:
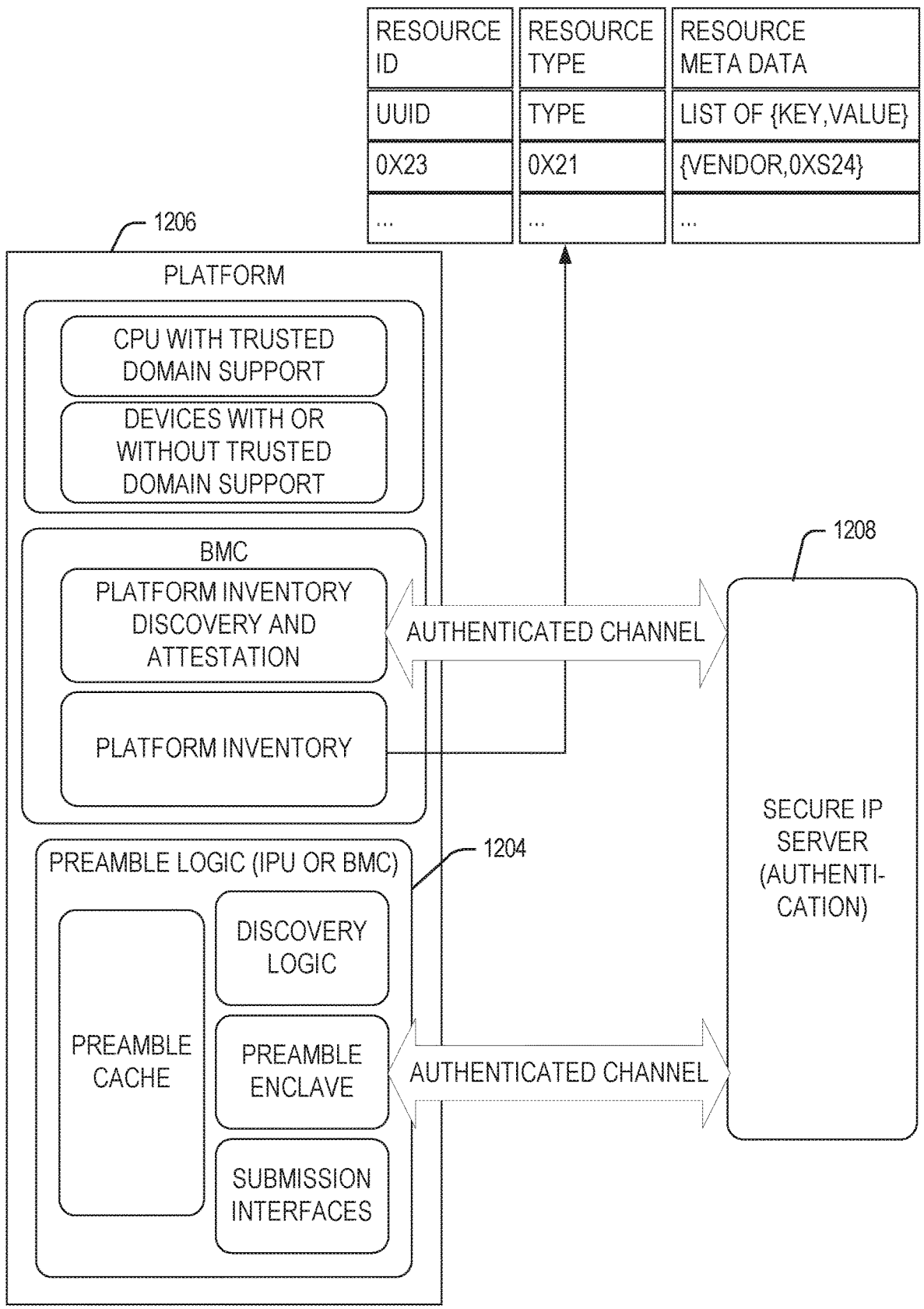
FIG. 12 illustrates an example architecture for security-based orchestration using a preamble according to an example.

FIG. 12 illustrates an example architecture for security-based orchestration using a preamble according to an example. The architecture includes a platform 1206, which may communicate with an attestation server 1208. The platform 1206 may include the PREAMBLE logic 1204, which is responsible for acting as a secure host or enclave for the preamble. The preamble may use discovery logic to discover and attest the resources available on the platform 1208. The PREAMBLE logic 1204 may be inside the IPU. BMC, programmable NIC, etc., while being isolated from the compute elements of the platform 1206, both for security of the platform 1206 and for security of the preamble. The PREAMBLE logic 1204 may include a preamble cache that may be used in order to implement a secure hierarchical cache across the edges to cache the preambles that services can use in a distributed manner. The example platform 1206 shown in FIG. 12 includes a BMC for executing services via a trusted domain. The BMC may obtain or store platform inventory of resources to provide to the preamble on request, including security of the resources.

In an example, the PREAMBLE logic 1204 may include a bitstream to be executed in a FPGA. The preamble may implement a rule-based selection of resources, with or without an, such as with a rule-based decision model. After the platform 1206 is attested as having the requested properties, the services may proceed in a trusted domain. The preamble may include a design choice (e.g., as a trade-off between security control and latency).

Figure 13:
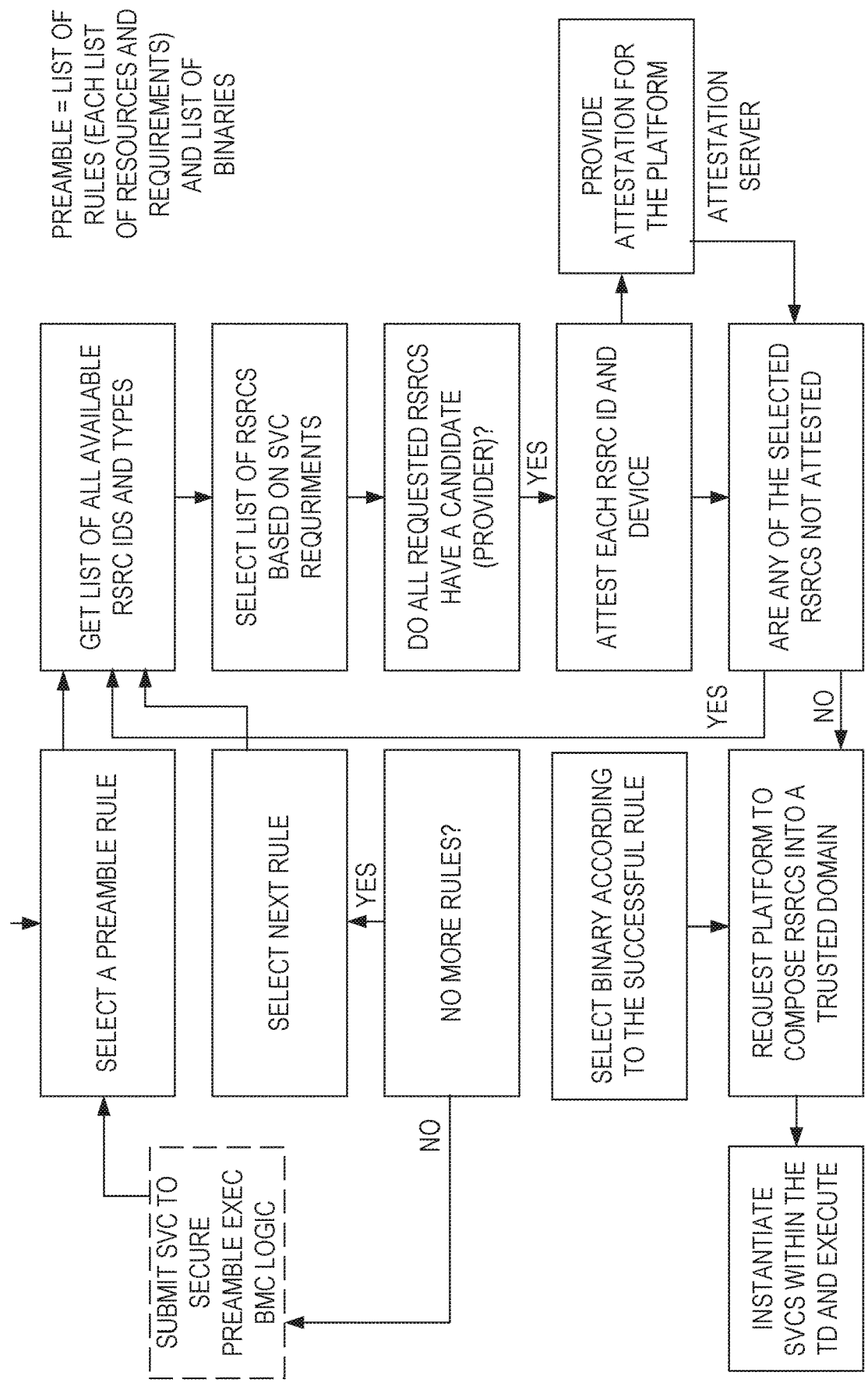
FIG. 13 illustrates a flow diagram showing security-based orchestration including a set of rules associated with services according to an example.

FIG. 13 illustrates a flow diagram showing security-based orchestration including a set of rules associated with services according to an example. The security-based orchestration in FIG. 13 includes further security options, and orchestration that may be performed without a trusted connection.

The flow diagram of FIG. 13 includes bring-in-your-own security methods (for "vendors") and bring-your-own-CMP (e.g., not just security, but a cloud management platform "CMP" vendor, for example, which may provide security, auditing, scaling, resiliency, optimization, scheduling, etc.). The techniques shown in FIG. 13 may be on-demand or based on use-case or service. These techniques may be used with a pre-created client enclave at a gateway that is capable of providing an SGX or TDX Trusted Execution Environment (TEE). Instead of requiring that client's preamble run at an FPGA or other programmable device, the preamble may run in a client confidential environment that is not dependent on trusting any device.

The technique may include allowing the client confidential TEE to complete the linking with a CMP commissioned by a client. In an example, the term CMP may refer to a vendor who may act as a mutually trusted intermediary between the CSP/CoSP and the client or may act to provide a value-added service to either or both the client or the infrastructure/platform service provider. The CMP may provide in-band security services to the client flexibly according to a guidance and/or negotiation protocol or API. Such an arrangement may provide the client to use a multi-cloud CMP to split consumption across more than one infrastructure provider in a seamless manner, thus further bolstering security, resiliency, etc.

The flow discussed above related to FIG. 11 includes a description of the flow when the preamble is a single binary or algorithm. FIG. 13 includes an expansion of that concept where the client may propose a set of rules that are binary or contingent (e.g., list of resources type, list of vendors etc.). Each rule may be associated to different binaries for that service. Depending on the rule, a more or less sensitive service instance maybe executed.

To improve resiliency of the network. (e.g., when a device providing a service or a network segment on the main path is experiencing issues), the client or the edge device on the network requesting the security requirements may proactively issue a function request with preamble code on various paths. Using multiple paths ensures that when issues arise, whether compute, memory or storage, or network related, the specific client has a list of backup preamble code ready to use.

When the security requirement specified by the client (either as preamble code or a list of trusted vendors and required security methods for a function) do not exactly match available FaaS services, the service may still be provided. For example, when the client may specify a rule or reduced set of prioritized requirements (e.g., as a backup) such that the gateway may find a matching list in that case (e.g., at the same device, or by sending to another device known to the gateway). In another example, the client may have exhaustive information about available FaaS services.

In an example, the client preamble code may specify security requirements and some performance requirements (e.g., where multiple implementation of a function may be available from one or different vendors). In some examples, an implementation provides a number of security guarantees but is less-performant compared to another implementation providing a weaker security guarantee. In these examples, the APIs available on the gateway may be extended to provide some performance profile of the available functions (e.g., latency/speed for a given resource allocation). When the client preamble code may use a mapping function to best match the client's requirement with the available implementations, or P4-based language, which can be implemented on FPGA in efficient manner.

In an example, an FPGA may be used as a side-car where resiliency functions are applied (either before or after) as needed to ensure workload executes to completion. The 'resiliency side-car' concept creates a control-channel capability at the workload or application layer (e.g., referring to ISO layers). FPGA may integrate with IPU/NPU to gain access to control functions, orchestration etc., from peer control-plane nodes. FPGA as control-plane side-car may specialize in accelerated control functions that otherwise may be performed in a VM side-car. The FPGA may respond dynamically to resiliency recovery situations where exposure to FAFO events may be mitigated via just-in-time designs that are written to the FPGA.

Figure 14:
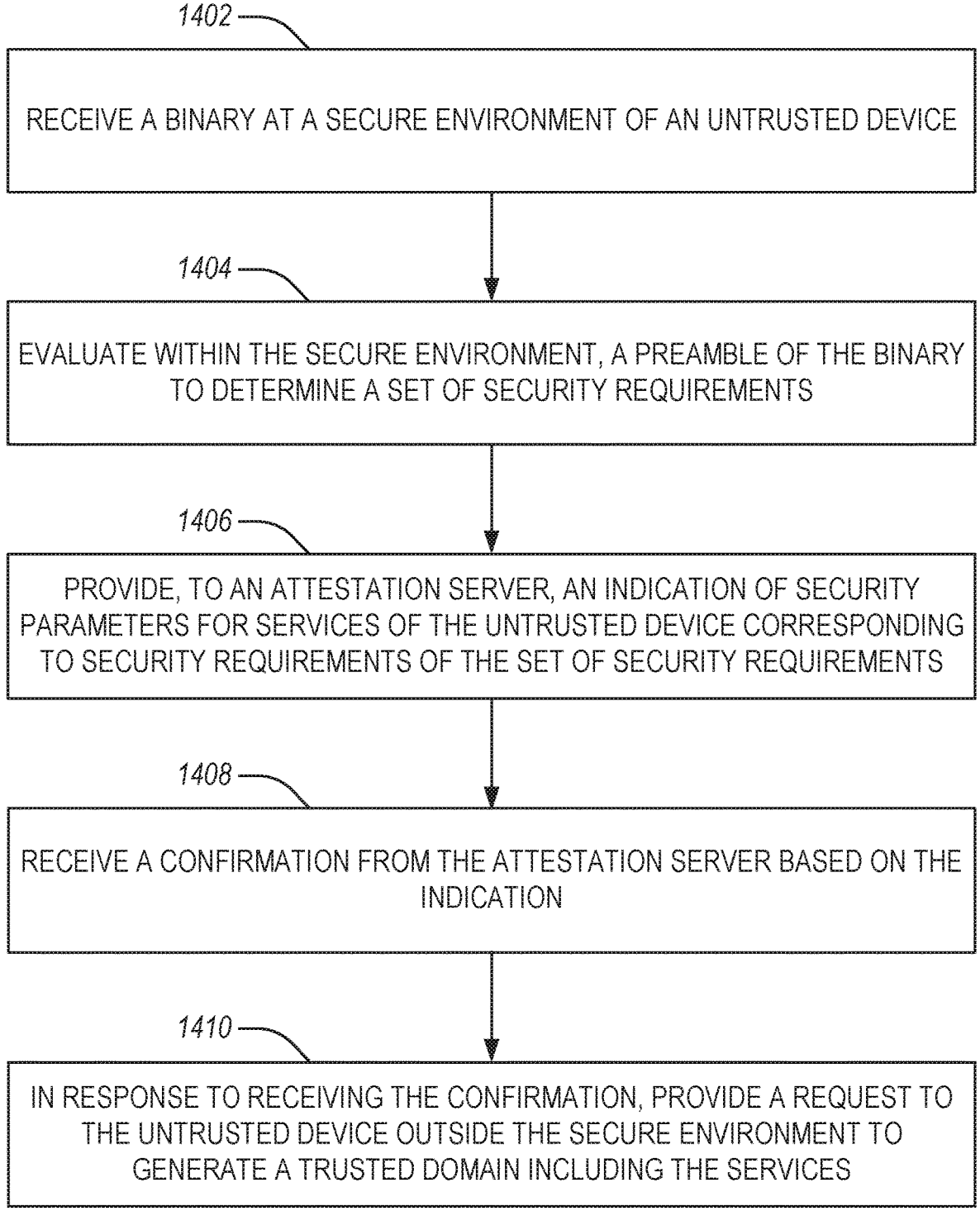
FIG. 14 illustrates a flowchart showing a technique for security-based orchestration using a preamble according to an example.

FIG. 14 illustrates a flowchart showing a technique 1400 for security-based orchestration using a preamble according to an example. The technique 1400 may be performed by a device in an edge network (e.g., in communication with one or more mobile devices, such as a phone, a vehicle, a tablet, etc.), such as a base station, a server, a mobile device, an IoT device, or the like. The device may be a device with an unknown trust level to an edge device sending the device information. For example, the edge device may be a mobile device, a vehicle, etc., which needs a particular service to execute, and requests that the device provide (or identify if it may provide) the service. In this example, the edge device may not necessarily trust or know a trust level of the device, and may treat it as untrusted initially. Other edge devices may already know the trust level of the device in some examples.

The technique 1400 includes an operation 1402 to receive a binary at a secure environment of a device with an unknown trust level. The binary may be received from a mobile device, such as a cell phone, a vehicle, etc. In some examples, the preamble is in a header of a packet, or in a header packet of the binary. The device may be one of at least two devices receiving the binary from an orchestration device.

The technique 1400 includes an operation 1404 to evaluate within the secure environment, a preamble of the binary to determine a set of security requirements. Operation 1404 may include sequentially determining whether a service of the device corresponding to each of the set of security requirements meets a respective security requirement. The set of security requirements may include at least two different levels of security for at least two respective services (e.g., a first level of security requirement corresponding to a first compute need and a second level of security requirement corresponding to a second compute need). In an example, evaluating the preamble includes evaluating a set of execution requirements, and wherein the instructions further cause the processing circuitry operating within the secure environment to perform operations including identifying the services based on both the execution requirements and the security requirements.

The technique 1400 includes an operation 1406 to provide, to an attestation server, an indication of security parameters for services of the device corresponding to security requirements of the set of security requirements. The technique 1400 includes an operation 1408 to receive a confirmation from the attestation server based on the indication. The technique 1400 includes an operation 1410 to in response to receiving the confirmation, provide a request to the device outside the secure environment to generate or retrieve a trusted domain including the services. In an example, the attestation server may be a logical entity with an orchestrator, a physical entity or both. The trusted domain may be saved, such that it is accessible to the device later (e.g., to run the same service for the same edge device), accessible to another networked device (e.g., another device in a network of the device, which may rely on the trust established between the device and the edge device, to provide services for the edge device), or identifiable to the edge device (e.g., such that other service providing devices may determine if they meet the requirements of the trusted domain or may implement the trusted domain).

In an example, the set of security requirements include at least one contingent security requirement, the contingent security requirement including a first requirement for a first level of security for a service, and a second requirement for a second level of security for the service requiring less security than the first level. In this example, when the first level of security is not met at the device, the technique 1400 may include providing the indication of security parameters for the services includes providing an indication of security parameters corresponding to the second level of security. In an example, the technique 1400 may include executing the services within the trusted domain using the binary.

In an example, the technique 1400 may include operations to evaluate a second preamble of a second binary to determine a second set of security requirements and a second set of execution requirements, determine that a security requirement of the second set of security requirements or an execution requirement of the second set of execution requirements cannot be met at the device, and in response to the determination, provide a notification that the respective requirement cannot be met.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or combinations with one or more of the other examples.

Example 1 is a device comprising: processing circuitry operating outside a secure environment; processing circuitry operating within a secure environment; and memory including instructions for security-based orchestration, which when executed by the processing circuitry operating within the secure environment, causes the processing circuitry operating within the secure environment to perform operations including: receiving, from an edge device, a binary file; evaluating a preamble of the binary file to determine a set of security requirements; providing, to an attestation server, an indication of security parameters for services of the device corresponding to security requirements of the set of security requirements; receiving a confirmation from the attestation server based on the indication; and in response to receiving the confirmation, providing a request to the processing circuitry operating outside the secure environment to generate a trusted domain outside the secure environment to execute the services.

In Example 2, the subject matter of Example 1 includes, wherein evaluating the preamble includes sequentially determining whether a service of the device corresponding to each of the set of security requirements meets a respective security requirement.

In Example 3, the subject matter of Examples 1-2 includes, wherein the instructions further cause the processing circuitry operating within the secure environment to perform operations including executing the services within the trusted domain using the binary file.

In Example 4, the subject matter of Examples 1-3 includes, wherein the set of security requirements include at least one contingent security requirement, the contingent security requirement including a first requirement for a first level of security for a service, and a second requirement for a second level of security for the service requiring less security than the first level.

In Example 5, the subject matter of Example 4 includes, wherein in response to the first level of security not being met at the device, the instructions further cause the processing circuitry operating within the secure environment to perform operations including providing the indication of security parameters for the services includes providing an indication of security parameters corresponding to the second level of security.

In Example 6, the subject matter of Examples 1-5 includes, wherein the set of security requirements include at least two different levels of security for at least two respective services.

In Example 7, the subject matter of Examples 1-6 includes, wherein the edge device is a vehicle.

In Example 8, the subject matter of Examples 1-7 includes, wherein the preamble is in a header of a packet or in a header packet of the binary file.

In Example 9, the subject matter of Examples 1-8 includes, wherein evaluating the preamble includes evaluating a set of execution requirements, and wherein the instructions further cause the processing circuitry operating within the secure environment to perform operations including identifying the services based on both the execution requirements and the security requirements.

In Example 10, the subject matter of Examples 1-9 includes, wherein the instructions further cause the processing circuitry operating within the secure environment to perform operations including: evaluating a second preamble of a second binary file to determine a second set of security requirements and a second set of execution requirements; determining that a security requirement of the second set of security requirements or an execution requirement of the second set of execution requirements cannot be met at the device; and in response to the determination, providing a notification that the respective requirement cannot be met.

In Example 11, the subject matter of Examples 1-10 includes, wherein the device is one of at least two devices receiving the binary file from an orchestration device.

In Example 12, the subject matter of Examples 1-11 includes, wherein the trusted domain is stored and accessible across a network by another device.

Example 13 is an apparatus for security-based orchestration, the apparatus comprising: means for receiving, from an edge device, a binary file at a secure environment of the apparatus; means for evaluating within the secure environment, a preamble of the binary file to determine a set of security requirements; means for providing, to an attestation server, an indication of security parameters for services of the apparatus corresponding to security requirements of the set of security requirements; means for receiving a confirmation from the attestation server based on the indication; and in response to receiving the confirmation, means for providing a request to the apparatus outside the secure environment to generate a trusted domain including the services.

In Example 14, the subject matter of Example 13 includes, wherein the means for evaluating the preamble include means for sequentially determining whether a service of the apparatus corresponding to each of the set of security requirements meets a respective security requirement.

In Example 15, the subject matter of Examples 13-14 includes, means for executing the services within the trusted domain using the binary file.

Example 16 is a method for security-based orchestration, the method comprising: receiving, from an edge device, a binary file at a secure environment of a device; evaluating within the secure environment, a preamble of the binary file to determine a set of security requirements; providing, to an attestation server, an indication of security parameters for services of the device corresponding to security requirements of the set of security requirements; receiving a confirmation from the attestation server based on the indication; and in response to receiving the confirmation, providing a request to the device outside the secure environment to generate a trusted domain including the services.

In Example 17, the subject matter of Example 16 includes, wherein the set of security requirements include at least one contingent security requirement, the contingent security requirement including a first requirement for a first level of security for a service, and a second requirement for a second level of security for the service requiring less security than the first level.

In Example 18, the subject matter of Example 17 includes, wherein when the first level of security is not met at the device, providing the indication of security parameters for the services includes providing an indication of security parameters corresponding to the second level of security.

In Example 19, the subject matter of Examples 16-18 includes, wherein the preamble is in a header of a packet or in a header packet of the binary file.

In Example 20, the subject matter of Examples 16-19 includes, wherein evaluating the preamble includes evaluating a set of execution requirements, and further comprising identifying the services based on both the set of execution requirements and the security requirements.

Example 21 is a data structure stored on a machine-readable medium comprising: a preamble stored in the machine-readable medium, which when executed in a secure environment of a device, causes processing circuitry of the secure environment to perform operations including: evaluating within the secure environment, the preamble to determine a set of security requirements; providing, to an attestation server, an indication of security parameters for services of the device corresponding to security requirements of the set of security requirements; receiving a confirmation from the attestation server based on the indication; and in response to receiving the confirmation, providing a request to the device outside the secure environment to generate a trusted domain including the services.

In Example 22, the subject matter of Example 21 includes, wherein the non-transitory machine-readable medium includes operations for execution in the trusted domain by the services.

In Example 23, the subject matter of Example 22 includes, wherein the data structure is configured to prevent execution of the operations unless the set of security requirements are met.

In Example 24, the subject matter of Examples 21-23 includes, wherein the non-transitory machine-readable medium includes routing information.

In Example 25, the subject matter of Examples 21-24 includes, wherein the preamble includes a set of execution requirements, and wherein the preamble, when executed, causes the processing circuitry to determine whether the device is configured to provide services corresponding to the set of execution requirements and subject to the set of security requirements.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Another example implementation is an edge computing system, including respective edge processing devices and nodes to invoke or perform the operations of Examples 1-25, or other subject matter described herein.

Another example implementation is a client endpoint node, operable to invoke or perform the operations of Examples 1-25, or other subject matter described herein.

Another example implementation is an aggregation node, network hub node, gateway node, or core data processing node, within or coupled to an edge computing system, operable to invoke or perform the operations of Examples 1-25, or other subject matter described herein.

Another example implementation is an access point, base station, road-side unit, street-side unit, or on-premise unit, within or coupled to an edge computing system, operable to invoke or perform the operations of Examples 1-25, or other subject matter described herein.

Another example implementation is an edge provisioning node, service orchestration node, application orchestration node, or multi-tenant management node, within or coupled to an edge computing system, operable to invoke or perform the operations of Examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-25, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-25, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of Examples 1-25, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-25, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-25, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-25, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-25, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-25 or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-25, or other subject matter described herein.

Another example implementation is an apparatus of an edge computing system comprising means, logic, modules, or circuitry to invoke or perform the use cases discussed herein, with use of Examples 1-25, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A device comprising:
   processing circuitry operating outside a secure environment;
   processing circuitry operating within a secure environment; and
   memory including instructions for security-based orchestration, which when executed by the processing circuitry operating within the secure environment, causes the processing circuitry operating within the secure environment to perform operations including:
   receiving, from an edge device, a binary file;
   evaluating a preamble of the binary file to determine a set of security requirements;
   providing, to an attestation server, an indication of security parameters for services of the device corresponding to security requirements of the set of security requirements;
   receiving a confirmation from the attestation server based on the indication; and
   in response to receiving the confirmation, providing a request to the processing circuitry operating outside the secure environment to generate a trusted domain outside the secure environment to execute the services.

2. The device of claim 1, wherein evaluating the preamble includes sequentially determining whether a service of the device corresponding to each of the set of security requirements meets a respective security requirement.

3. The device of claim 1, wherein the instructions further cause the processing circuitry operating within the secure environment to perform operations including executing the services within the trusted domain using the binary file.

4. The device of claim 1, wherein the set of security requirements include at least one contingent security requirement, the contingent security requirement including a first requirement for a first level of security for a service, and a second requirement for a second level of security for the service requiring less security than the first level.

5. The device of claim 4, wherein in response to the first level of security not being met at the device, the instructions further cause the processing circuitry operating within the secure environment to perform operations including providing the indication of security parameters for the services includes providing an indication of security parameters corresponding to the second level of security.

6. The device of claim 1, wherein the set of security requirements include at least two different levels of security for at least two respective services.

7. The device of claim 1, wherein the edge device is a vehicle.

8. The device of claim 1, wherein the preamble is in a header of a packet or in a header packet of the binary file.

9. The device of claim 1, wherein evaluating the preamble includes evaluating a set of execution requirements, and wherein the instructions further cause the processing circuitry operating within the secure environment to perform operations including identifying the services based on both the execution requirements and the security requirements.

10. The device of claim 1, wherein the instructions further cause the processing circuitry operating within the secure environment to perform operations including:
evaluating a second preamble of a second binary file to determine a second set of security requirements and a second set of execution requirements;
determining that a security requirement of the second set of security requirements or an execution requirement of the second set of execution requirements cannot be met at the device; and
in response to the determination, providing a notification that the respective requirement cannot be met.

11. The device of claim 1, wherein the device is one of at least two devices receiving the binary file from an orchestration device.

12. The device of claim 1, wherein the trusted domain is stored and accessible across a network by another device.

13. An apparatus for security-based orchestration, the apparatus comprising:
means for receiving, from an edge device, a binary file at a secure environment of the apparatus;
means for evaluating within the secure environment, a preamble of the binary file to determine a set of security requirements;
means for providing, to an attestation server, an indication of security parameters for services of the apparatus corresponding to security requirements of the set of security requirements;
means for receiving a confirmation from the attestation server based on the indication; and
in response to receiving the confirmation, means for providing a request to the apparatus outside the secure environment to generate a trusted domain including the services.

14. The apparatus of claim 13, wherein the means for evaluating the preamble include means for sequentially determining whether a service of the apparatus corresponding to each of the set of security requirements meets a respective security requirement.

15. The apparatus of claim 13, further comprising means for executing the services within the trusted domain using the binary file.

16. A method for security-based orchestration, the method comprising:
receiving, from an edge device, a binary file at a secure environment of a device;
evaluating within the secure environment, a preamble of the binary file to determine a set of security requirements;
providing, to an attestation server, an indication of security parameters for services of the device corresponding to security requirements of the set of security requirements;
receiving a confirmation from the attestation server based on the indication; and
in response to receiving the confirmation, providing a request to the device outside the secure environment to generate a trusted domain including the services.

17. The method of claim 16, wherein the set of security requirements include at least one contingent security requirement, the contingent security requirement including a first requirement for a first level of security for a service, and a second requirement for a second level of security for the service requiring less security than the first level.

18. The method of claim 17, wherein when the first level of security is not met at the device, providing the indication of security parameters for the services includes providing an indication of security parameters corresponding to the second level of security.

19. The method of claim 16, wherein the preamble is in a header of a packet or in a header packet of the binary file.

20. The method of claim 16, wherein evaluating the preamble includes evaluating a set of execution requirements, and further comprising identifying the services based on both the set of execution requirements and the security requirements.

21. A non-transitory machine-readable medium having a program stored thereon, which when executed by processing circuitry, causes a secure environment of a device to perform operations comprising:
evaluating within the secure environment, a preamble of the program to determine a set of security requirements;
providing, to an attestation server, an indication of security parameters for services of the device corresponding to security requirements of the set of security requirements;
receiving a confirmation from the attestation server based on the indication; and
in response to receiving the confirmation, providing a request to the device outside the secure environment to generate a trusted domain including the services.

22. The non-transitory machine-readable medium of claim 21, wherein the non-transitory machine-readable medium includes operations for execution in the trusted domain by the services.

23. The non-transitory machine-readable medium of claim 22, wherein the program is configured to prevent execution of the operations unless the set of security requirements are met.

24. The non-transitory machine-readable medium of claim 21, wherein the non-transitory machine-readable medium includes routing information.

25. The non-transitory machine-readable medium of claim 21, wherein the preamble includes a set of execution requirements, and wherein the, program, when executed, causes the processing circuitry to determine whether the device is configured to provide services corresponding to the set of execution requirements and subject to the set of security requirements.

\* \* \* \* \*